US009752236B2

(12) United States Patent
Fellows et al.

(10) Patent No.: US 9,752,236 B2
(45) Date of Patent: Sep. 5, 2017

(54) CORROSION INHIBITORS

(75) Inventors: Alan Fellows, Birmingham (GB); Kevan Hatchman, Wolverhampton (GB); Chris Jones, Cheslyn Hay (GB)

(73) Assignee: Rhodia Operations, Paris (FR)

( * ) Notice: Subject to any disclaimer, the term of this patent is extended or adjusted under 35 U.S.C. 154(b) by 692 days.

(21) Appl. No.: 13/992,674

(22) PCT Filed: Dec. 8, 2011

(86) PCT No.: PCT/GB2011/052427
§ 371 (c)(1),
(2), (4) Date: Oct. 25, 2013

(87) PCT Pub. No.: WO2012/076887
PCT Pub. Date: Jun. 14, 2012

(65) Prior Publication Data
US 2014/0135239 A1    May 15, 2014

(30) Foreign Application Priority Data

Dec. 8, 2010    (GB) .................................. 1020798.3

(51) Int. Cl.
*C09K 8/54*    (2006.01)
*C23F 11/16*    (2006.01)
*C23F 11/04*    (2006.01)

(52) U.S. Cl.
CPC .............. *C23F 11/163* (2013.01); *C09K 8/54* (2013.01); *C23F 11/04* (2013.01)

(58) Field of Classification Search
None
See application file for complete search history.

(56) References Cited

U.S. PATENT DOCUMENTS

| 2,658,036 A | 11/1953 | Core |
| 2,788,329 A * | 4/1957 | Yost ...................... C11D 1/123 |
| | | 252/390 |
| 3,017,355 A | 1/1962 | Oakes |
| 3,765,873 A * | 10/1973 | Sato ...................... C22B 23/021 |
| | | 423/142 |
| 4,096,077 A * | 6/1978 | Swakon ............... C10M 141/00 |
| | | 508/280 |

(Continued)

FOREIGN PATENT DOCUMENTS

| CN | 101280180 A | 10/2008 |
| CN | 101525563 A | 9/2009 |
| GB | 2313121 A | 11/1997 |

OTHER PUBLICATIONS

UK Patent Office, Search Report dated Apr. 7, 2011.
(Continued)

*Primary Examiner* — John J Figueroa

(57) ABSTRACT

The present invention provides the use of a sulfosuccinate as a corrosion inhibitor. In particular, the sulfosuccinate may be used to inhibit the corrosion of a metal component that is, or will be, in contact with an aqueous fluid, in order to prevent or reduce corrosion of the metal component. The sulfosuccinate may be used to inhibit corrosion of a metal component in an industrial aqueous system, such as a hydrocarbon plant; a chemical plant; a water plant; or a paper manufacturing plant, and in particular in an oilfield system or a downstream oil-related system.

24 Claims, 6 Drawing Sheets

Sulfosuccinate corrosion inhibitors - performance over a 15 hour period

(56) References Cited

U.S. PATENT DOCUMENTS

| | | | | |
|---|---|---|---|---|
| 4,670,163 A * | 6/1987 | Lindstrom | ............... | C09K 8/54 |
| | | | | 166/902 |
| 5,872,261 A * | 2/1999 | Bremmer | ............. | C07D 207/46 |
| | | | | 548/542 |
| 6,287,480 B1 | 9/2001 | Berglund | | |
| 7,087,571 B1 * | 8/2006 | O'Lenick, Jr. | ......... | A61K 8/604 |
| | | | | 424/401 |

OTHER PUBLICATIONS

I.L. Lehr, S.B. Saidman, "Corrosion protection of iron by polypyrroleccoatings electrosynthesised from a surfactant solution", Corrosion Science, 49, (2007), 2210-2225.
SIPO; Office Action for Chinese Application No. 201180058955.7, dated Oct. 30, 2014, 5 pages.

* cited by examiner

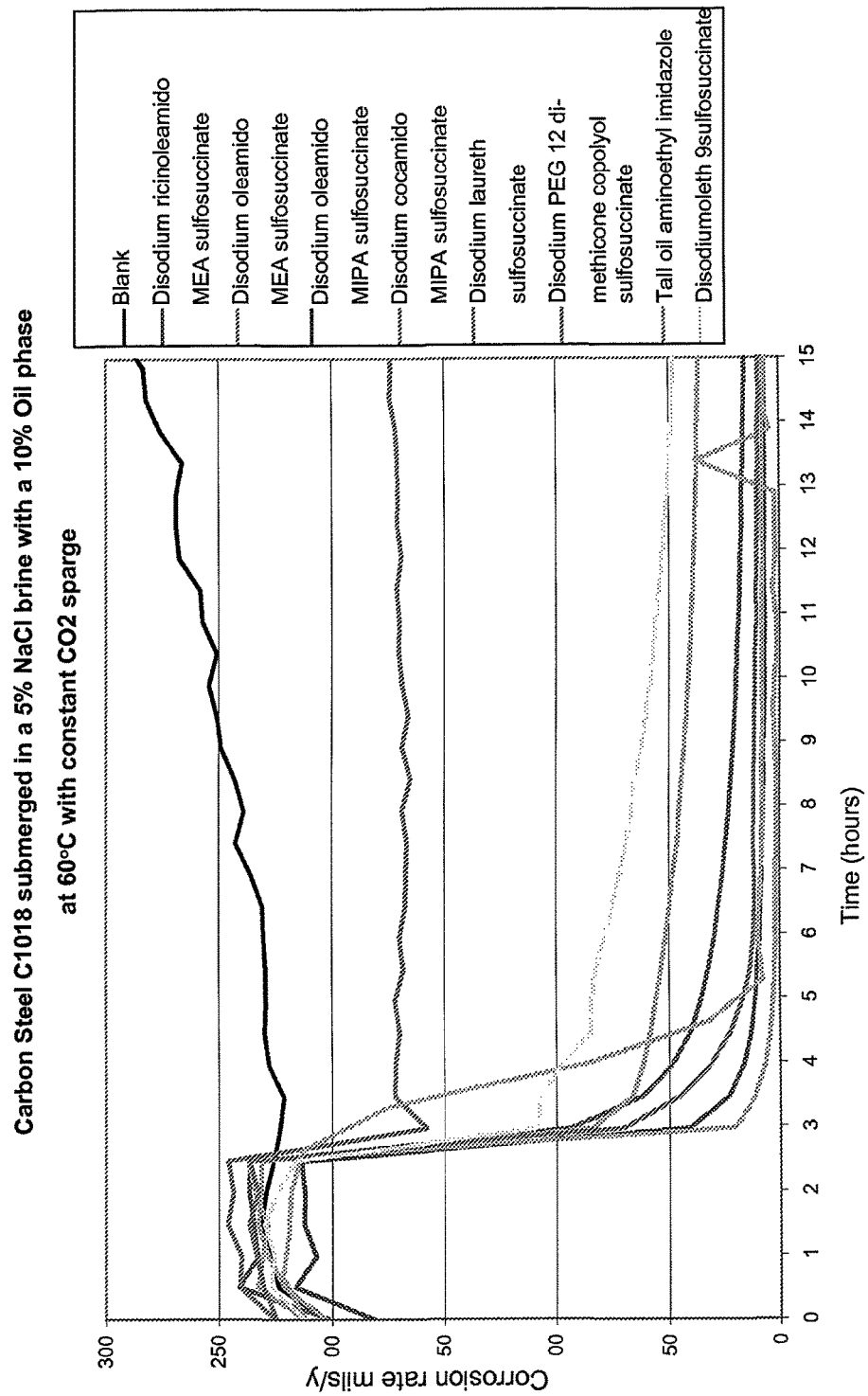
Figure 2: Sulfosuccinate corrosion inhibitors - performance over a 15 hour period

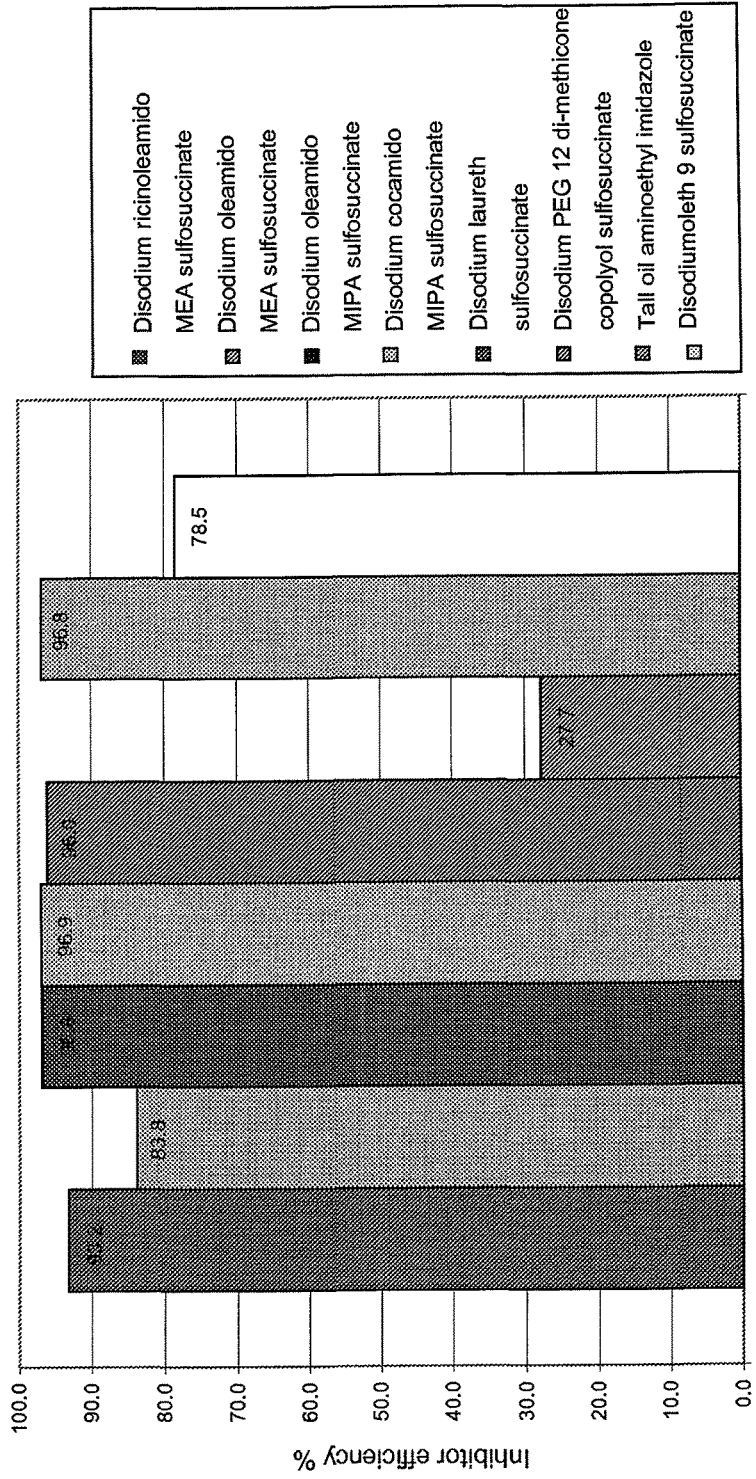
Figure 3: Sulfosuccinate corrosion inhibitor - efficiency after 15 hours

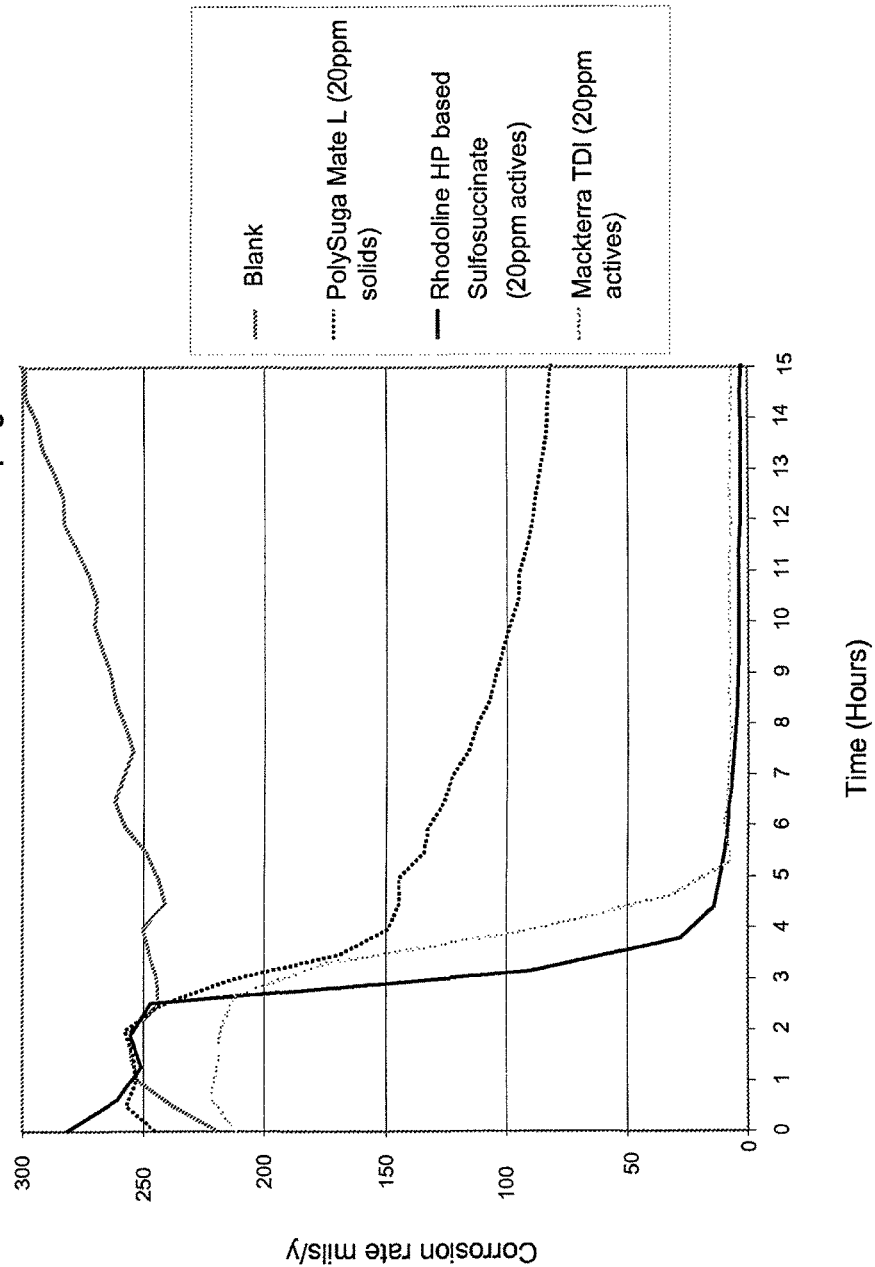
Figure 4 - Sulfosuccinate corrosion inhibition performance over a 15 hour period

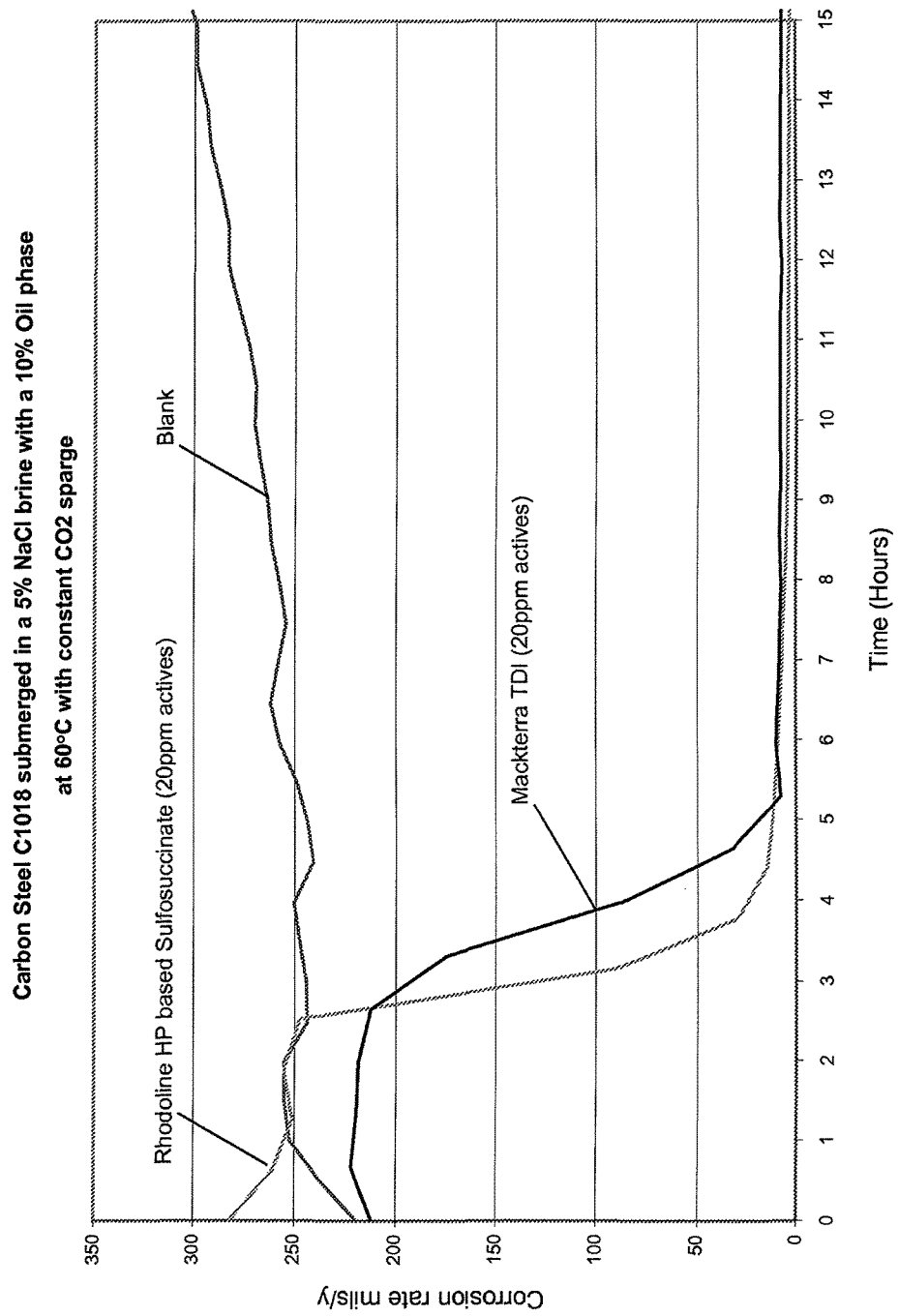
Figure 5 - Sulfosuccinate corrosion inhibition performance over a 15 hour period

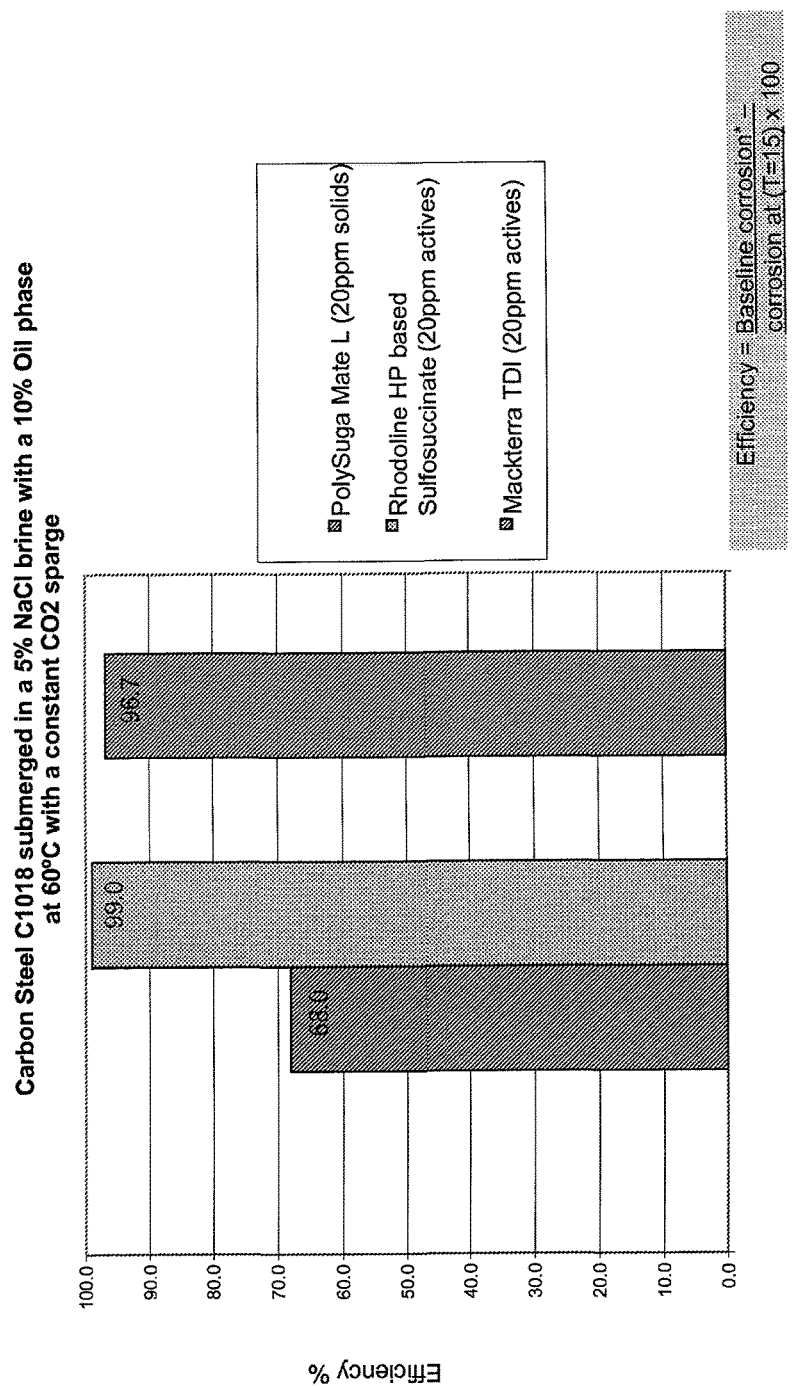
Figure 6 - Sulfosuccinate corrosion inhibitor efficiency after 15 hours

CORROSION INHIBITORS

CROSS-REFERENCE TO RELATED APPLICATIONS

This application is filed under the provisions of 35 U.S.C. §371 and claims the benefit of International Patent Application No. PCT/GB2011/052427, filed on Dec. 8, 2011, which claims the benefit of foreign patent application GB1020798.3, filed in Great Britain Dec. 8, 2010; all of which are hereby incorporated by reference in their entirety.

The present invention relates to the use of sulfosuccinates as corrosion inhibitors, especially in oilfield applications.

BACKGROUND TO THE INVENTION

Sulfosuccinates are a class of surfactants based upon sulfosuccinic acid. There are two types of sulfosuccinate: half ester (or monoester) and diester. These two types of sulfosuccinate are shown below, with sodium as the cation. It is, however, known that other cations may also be used instead of sodium to provide the neutralised salt product, such as potassium, magnesium or ammonium.

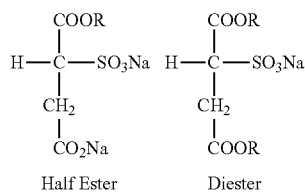

The sulfosuccinates can also be classified into two main groups based on the starting materials used for their manufacture: (i) fatty alkanolamide (including alkoxylated alkanolamide) derived sulfosuccinates, and (ii) fatty alcohol (including alkoxylated alcohol) derived sulfosuccinates. These starting materials affect the R group in the sulfosuccinate.

The half ester sulfosuccinates are well known for use as mildness additives, foam boosters and rheology modifiers in skin and hair care products, such as shampoo and facial and body washes. The diester sulfosuccinates are better known as industrial wetting agents, dispersants and emulsifiers.

Typical half ester sulfosuccinates are prepared by reacting a fatty alkanolamide (or ethoxylated fatty alkanolamide) or a fatty alcohol (or ethoxylated/propoxylated fatty alcohol) with maleic anhydride to form an intermediate half ester. The intermediate half ester is then reacted with a bisulfite (e.g. sodium or potassium bisulfite) to form the sulfosuccinate.

The diester sulfosuccinates are made by a similar process, but with two equivalents of the fatty alkanolamide, ethoxylated alkanolamide, fatty alcohol or ethoxylated and/or propoxylated alcohol being reacted with maleic anhydride to form an intermediate diester, which is then reacted with a bisulfite (e.g. sodium or potassium bisulfite) to form the diester sulfosuccinate.

An example reaction scheme for the preparation of a half ester sulfosuccinate from a fatty alkanolamide is shown in FIG. 1.

It is well known that steel and other metal surfaces can corrode in the presence of aqueous environments; especially acidic aqueous environments such as those found in subterranean wells, which can pass through formations containing high concentrations of corrosive materials such as hydrogen sulphide, carbon dioxide, brine, and the like.

Alloy technology and galvanisation have resulted in materials that can withstand some incidental contact with corrosive environments, but in a number of industrial applications (such as hydrocarbon exploration, recovery and refining, and chemical processing) more prolonged contact with corrosive environments occurs. In particular, during the working life of an oil or gas well various conduits and other components in the production zone encounter considerable acidic corrosion.

Corrosion inhibitors are therefore widely used in oil and gas production wells and pipelines to reduce corrosion of metal components and therefore prevent consequential production equipment failures.

Imidazolines are commonly used as corrosion inhibitors, and are viewed as the industry standard, but are known to have poor aquatic toxicity.

There is therefore a continuing need for corrosion inhibitors, for use in the oil and gas industry and other industrial applications, which have improved aquatic toxicity and biodegradability.

SUMMARY OF THE INVENTION

The present invention provides, in a first aspect, the use of a sulfosuccinate as a corrosion inhibitor.

In particular, the sulfosuccinate can be used to inhibit the corrosion of a metal component, that is, or will be, in contact with an aqueous fluid, in order to prevent or reduce corrosion of the metal component.

The present invention also provides, in a second aspect, a method of preventing or reducing corrosion of a metal component that is in contact with, or will be in contact with, an aqueous fluid, wherein the method comprises:
  providing a sulfosuccinate; and
  applying the sulfosuccinate to the metal component or adding the sulfosuccinate to the aqueous fluid that is in contact with, or will be in contact with, the metal component.

Sulfosuccinates can have good compatibility with non-ionic, anionic and amphoteric corrosion inhibitors, therefore permitting corrosion inhibitor formulations to be produced that comprise combinations of two or more different corrosion inhibitors.

Accordingly, in a third aspect there is provided a corrosion inhibitor formulation that comprises a sulfosuccinate together with a corrosion inhibitor that is not a sulfosuccinate.

Sulfosuccinates have been surprisingly identified as effective corrosion inhibitors. Further, they exhibit lower aquatic toxicity than imidazolines. Information regarding the toxicity of sulfosuccinates can be found in Chapter 9, Anionic surfactants, Ed: H W Stache, Surfactant Science Series, Vol: 56, Marcel Dekker (1996). Specific data is also available for dioctylsulfosuccinate type sulfosuccinates in the European Commission's Detergent Ingredient Database (DID) (January 2007 version).

A further benefit is that sulfosuccinates can be tailored to have a molecular weight of greater than 700 Da, which would mean they would be classified as non bio-accumulating (according to the OSPAR Guidelines for Completing the Harmonised Offshore Chemical Notification Format (HOCNF) (Reference number: 2008-5), paragraph 38).

Additionally, sulfosuccinates are beneficial in that they are biodegradable and can be cleaved by hydrolysis by acids or by bases.

Therefore sulfosuccinates have been identified as providing a number of advantages over known corrosion inhibitors.

BRIEF DESCRIPTION OF THE FIGURES

FIG. 2 shows the performance (corrosion rate) over a 15 hour period of sulfosuccinate corrosion inhibitors.

FIG. 3 shows corrosion efficiency of sulfosuccinate corrosion inhibitors after 15 hours.

FIG. 4 shows sulfosuccinate corrosion inhibition performance over a 15 hour period.

FIG. 5 shows a direct comparison between terpene block alkoxylated half ester sulfosuccinate and the industry standard (tall oil aminoethyl imidazoline).

FIG. 6 shows sulfosuccinate corrosion inhibitor efficiency after 15 hours.

DETAILED DESCRIPTION OF THE INVENTION

Figure 1:
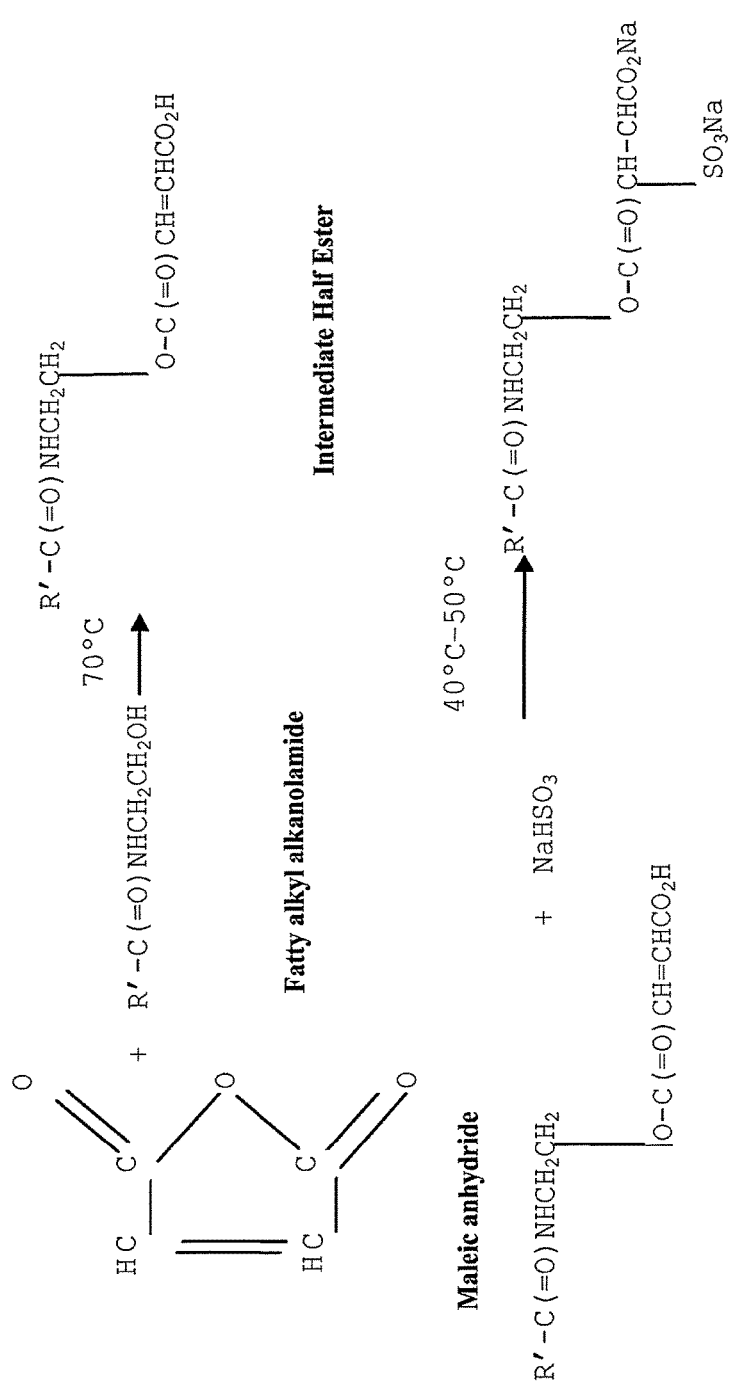
FIG. 1 shows an example reaction scheme for the preparation of a half ester sulfosuccinate from a fatty alkanolamide.

The sulfosuccinate used in the present invention may be a monoester sulfosuccinate or a diester sulfosuccinate.

Only one sulfosuccinate may be used, or a combination of more than one sulfosuccinate may be used. When more than one is used, these may all be monoesters, or may all be diesters, or they may be a mixture of monoester and diester sulfosuccinates.

The (or each) sulfosuccinate may suitably be derived from a fatty alkanolamide, a fatty alkoxylated alkanolamide, a fatty alcohol, a fatty alkoxylated alcohol, an alkoxylated terpene group, or an alkyl polyglucoside.

In this context, a "fatty" group is preferably a C8-30 unbranched alkyl or alkenyl group, e.g. a fatty alcohol is R'OH where R' is a hydrocarbon group which is a C8-30 unbranched alkyl or alkenyl group. In some embodiments, the "fatty" group may be a C10-22 unbranched alkyl or alkenyl group, such as a C11-20 unbranched alkyl or alkenyl group, e.g. a C12-18 unbranched alkyl or alkenyl group. In some embodiments, the "fatty" group may be a C12-24 unbranched alkyl or alkenyl group. The alkoxylated terpene group may suitably have a C8 to C30 terpene group which may be acyclic or cyclic; for example it may have a C8 to C24, C8 to C22, C8 to C20, C8 to C16, or C9 to C15 terpene group. The terpene alkoxylate from which the sulfosuccinate can be derived preferably has an HLB of less than 10, e.g. from 0 to 7, more preferably 5 or less, e.g. from 1 to 5, such as from 2 to 4 or from 3 to 5 or from 3 to 4. The alkyl polyglucoside may suitably have an alkyl group that is a C8 to C30 branched or unbranched alkyl group, such as a C8 to C25, C8 to C22, C9 to C20, C10 to C18, or C10 to C16 branched or unbranched alkyl group; in one embodiment it may be a C12 to C30 branched or unbranched alkyl group, such as a C12 to C25, C12 to C22, C12 to C20, C12 to C18, or C12 to C16 branched or unbranched alkyl group. In one embodiment the alkyl polyglucoside may have an alkyl group that is a C12 to C24 branched or unbranched alkyl group. For the alkoxylated products, the degree of alkoxylation is suitably from 1 to 50, such as from 1 to 40, from 1 to 30, from 1 to 24, from 1 to 20, or from 1 to 12; the alkoxylating groups may suitably be selected from C1-C4 alkoxy group, such as ethoxy, propoxy or butoxy, or combinations thereof.

In one embodiment, the total number of carbon atoms in the (or each) sulfosuccinate is from 12 to 350, such as from 13 to 250, or from 14 to 150, or from 15 to 100. It may be from 12 to 90, or from 13 to 80, or from 14 to 70, or from 15 to 60. Preferably it is from 12 to 50, such as from 13 to 45, or from 14 to 40, or from 15 to 35. In one embodiment it may be from 16 to 30, such as from 17 to 29, or from 18 to 28, or from 19 to 27, or from 20 to 26.

For the alkoxylated products, the alkoxylating group may suitably be a C1-C4 alkoxy group, such as ethoxy, propoxy or butoxy, or combinations thereof. For example, the invention envisages, inter alia, ethoxylation, propoxylation, butoxylation, and block alkoxylation with (EO)(PO), (EO)(BO), (PO)(EO) and (BO)(EO).

In one embodiment, the (or each) sulfosuccinate is derived from a fatty alkanolamide, a fatty ethoxylated alkanolamide, a fatty alcohol, a fatty ethoxylated alcohol, a fatty propoxylated alcohol, a fatty butoxylated alcohol, an ethoxylated terpene group, a propoxylated terpene group, a butoxylated terpene group, an (EO)(PO), (EO)(BO), (PO)(EO) or (BO)(EO) block alkoxylated terpene group, or an alkyl polyglucoside wherein the polyglucoside has a degree of polymerisation (i.e. the average number of glucose units per alkyl group) of from 1 to 15, preferably from 1 to 10, e.g. from 1 to 5.

In one preferred embodiment, the (or each) sulfosuccinate is derived from a C8-30 fatty alkanolamide, a fatty ethoxylated C8-30 alkanolamide, a fatty C8-30 alcohol, a fatty ethoxylated C8-30 alcohol, a fatty propoxylated C8-30 alcohol, a fatty butoxylated C8-30 alcohol, an ethoxylated C8-30 terpene group, a propoxylated C8-30 terpene group, a butoxylated C8-30 terpene group, an (EO)(PO), (EO)(BO), (PO)(EO) or (BO)(EO) block alkoxylated C8-30 terpene group, or an alkyl polyglucoside where the alkyl is C8-30 alkyl and wherein the polyglucoside has a degree of polymerisation of from 1 to 15, preferably from 1 to 10, e.g. from 1 to 5.

For the alkoxylated products, the degree of alkoxylation is suitably from 1 to 50, such as from 1 to 40, e.g. from 1 to 30; preferably from 1 to 20.

For the alkyl polyglucoside derived products, the polyglucoside may in one embodiment have a degree of polymerisation of from 1 to 15, and preferably from 1 to 10, e.g. from 1 to 9, from 1 to 8, from 1 to 7 or from 1 to 6. Typically it may be from 1 to 5 or from 1 to 4. Sulfosuccinates derived from alkyl polyglucoside as described in U.S. Pat. No. 6,627,612 and U.S. Pat. No. 7,507,399 are stated to have an average degree of polymerisation of around 4. In one embodiment for the alkyl polyglucoside derived products, the polyglucoside has a degree of polymerisation of from 1 to 3; more preferably from 1 to 2; for example from 1.1 to 1.8 or from 1.1 to 1.7; such as from 1.2 to 1.6; most preferably from 1.2 to 1.5.

In one preferred embodiment, the (or each) sulfosuccinate is derived from a C10-22 fatty alkanolamide, a fatty ethoxylated C10-22 alkanolamide, a fatty C10-22 alcohol, a fatty ethoxylated C10-22 alcohol, a fatty propoxylated C10-22 alcohol, a fatty butoxylated C10-22 alcohol, an ethoxylated C10-22 terpene group, a propoxylated C10-22 terpene group, a butoxylated C10-22 terpene group, an (EO)(PO), (EO)(BO), (PO)(EO) or (BO)(EO) block alkoxylated C10-22 terpene group, or an alkyl polyglucoside where the alkyl is C10-22 alkyl and wherein the polyglucoside has a degree of polymerisation of from 1 to 15, preferably from 1 to 10, e.g. from 1 to 5.

In one embodiment, the (or each) sulfosuccinate is of formula (I) or formula (II):

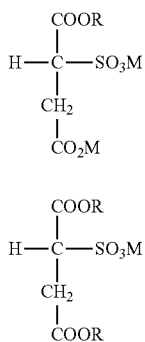
(I)

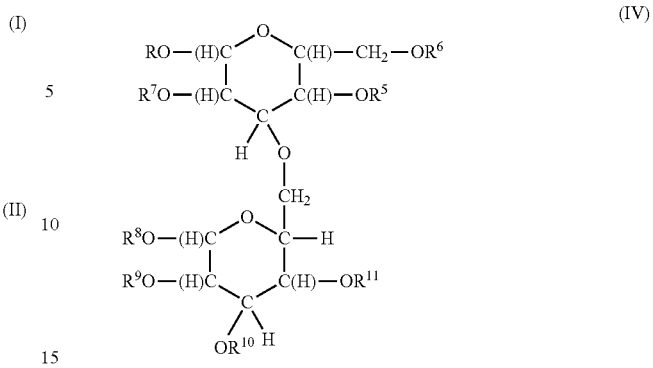
(IV)

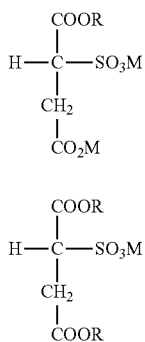
(II)

wherein

M is a monovalent or divalent cation; and

R is:

(i) a hydrocarbon group which is a C8-30 unbranched alkyl or alkenyl group; or (ii-a) R'—(O—C$_2$H$_4$)$_x$—, where R' is a hydrocarbon group which is a C8-30 unbranched alkyl or alkenyl group or a C8-C30 terpene group, and x is an integer from 1 to 50; or (ii-b) R'—(O—C$_3$H$_6$)$_x$—, where R' is a hydrocarbon group which is a C8-30 unbranched alkyl or alkenyl group or a C8-C30 terpene group, and x is an integer from 1 to 50; or (ii-c) R'—(O—C$_4$-C$_4$H$_8$)$_x$—, where R' is a hydrocarbon group which is a C8-30 unbranched alkyl or alkenyl group or a C8-C30 terpene group, and x is an integer from 1 to 50; or (ii-d) R'—(O—C$_y$H$_{2y}$)$_{x'}$—(O—C$_2$H$_4$)$_{x''}$—, where R' is a hydrocarbon group which is a C8-30 unbranched alkyl or alkenyl group or a C8-C30 terpene group, y is 3 or 4, x' is an integer from 1 to 50, and x'' is an integer from 1 to 50; or (ii-e) R'—(O—C$_2$H$_4$)$_{x''}$(O—C$_y$H$_{2y}$)$_{x'}$—, where R' is a hydrocarbon group which is a C8-30 unbranched alkyl or alkenyl group or a C8-C30 terpene group, y is 3 or 4, x' is an integer from 1 to 50, and x'' is an integer from 1 to 50; or (iii) R'—C(=O)—NH—R$^a$—, where R' is a hydrocarbon group which is a C8-30 unbranched alkyl or alkenyl group, and R$^a$ is a C1-C6 alkyl or C2-C6 alkoxyalkyl, or (iv) R'—(O—CH$_2$—CH$_2$)$_x$—C(=O)—NH—R$^a$—, where R' is a hydrocarbon group which is a C8-30 unbranched alkyl or alkenyl group, and R$^a$ is a C1-C6 alkyl or C2-C6 alkoxyalkyl, and x is an integer from 1 to 50;

or the (or each) sulfosuccinate is made up of units of formula (III) and/or (IV):

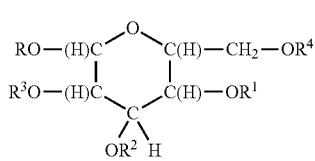
(III)

wherein

R is a C8-30 alkyl group;

R$^1$, R$^2$, R$^3$ and R$^4$ are independently selected from the group consisting of hydrogen and —CH$_2$CH(OH)CH$_2$—R$^{12}$, with the proviso that R$^1$, R$^2$, R$^3$ and R$^4$ are not all hydrogen;

R$^5$, R$^6$, R$^7$ R$^8$, R$^9$ and R$^{11}$ are independently selected from the group consisting of hydrogen and —CH$_2$CH(OH)CH$_2$—R$^{12}$, and R$^{10}$ is selected from the group consisting of hydrogen, —CH$_2$CH(OH)CH$_2$—R$^{12}$, and

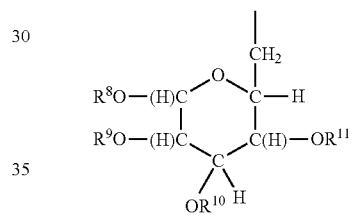

with the proviso that R$^5$, R$^6$, R$^7$ R$^8$, R$^9$, R$^{10}$ and R$^{11}$ are not all hydrogen, R$^{12}$ is

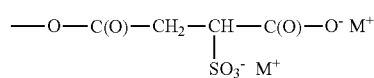

and M is a monovalent or divalent cation, wherein the overall degree of polymerisation of the sulfosuccinate product (i.e. the average number of glucose units per alkyl group R) is from 1 to 10, e.g. from 1 to 5.

As the skilled reader will appreciate, in formulae (I) and (II), option (i) is a sulfosuccinate derived from a fatty alcohol, option (ii-a) is a sulfosuccinate derived from an ethoxylated fatty alcohol or terpene group, option (ii-b) is a sulfosuccinate derived from a propoxylated fatty alcohol or terpene group, option (ii-c) is a sulfosuccinate derived from a butoxylated fatty alcohol or terpene group, option (ii-d) is a sulfosuccinate derived from an (EO)(PO) or (EO)(BO) block alkoxylated fatty alcohol or terpene group, option (ii-e) is a sulfosuccinate derived from a (PO)(EO) or (BO)(EO) block alkoxylated fatty alcohol or terpene group, option (iii) is a sulfosuccinate derived from a fatty alkanolamide and option (iv) is a sulfosuccinate derived from an ethoxylated fatty alkanolamide. Meanwhile, when the sulfosuccinate is made up of units of formula (III) and/or (IV), it will be an alkyl polyglucoside derived sulfosuccinate.

The skilled reader will understand that, due to the method by which they are synthesized, alkyl polyglucosides are generally present as mixtures of alkyl polyglucosides, where there are varying numbers of carbon atoms in the alkyl radical and where there are varying degrees of polymerisation. Thus, when referring to alkyl polyglucosides, the alkyl radical is generally referred to as having a range of carbon atoms, which cover the minimum and maximum length of alkyl carbon chains present in the mixture, and the degree of polymerisation is the average (mean) degree of polymerisation of the mixture.

The skilled reader will also understand that alkoxylated products (in this case, alkoxylated fatty alcohols, terpenes or fatty alkanolamides) are generally present as mixtures where there are varying numbers of alkoxylation. Thus, when referring to alkoxylated products, the degree of alkoxylation is the average (mean) degree of alkoxylation of the mixture.

In one embodiment, the (or each) sulfosuccinate is of formula (I) or formula (II), option (i), (ii-a), (ii-b), (ii-d), (iii) or (iv); or is made up of units of formula (III) and/or (IV).

In one embodiment, the (or each) sulfosuccinate is of formula (I), option (i), (ii-a), (ii-b), (ii-d), (iii) or (iv); or is made up of units of formula (III) and/or (IV).

In one embodiment, the (or each) sulfosuccinate is of formula (I), option (i), (ii-a), (ii-b), (iii-d), (iii) or (iv).

For options (iii) and (iv) for the sulfosuccinate of formula (I) or formula (II), it may in one preferred embodiment be that $R^a$ is a C1, C2, C3 or C4 alkyl (e.g. ethyl or propyl) or a C3, C4 or C5 alkoxyalkyl (e.g. methoxyethane, ethoxymethane or ethoxyethane).

Most preferably for options (iii) and (iv), $R^a$ is ethyl ($CH_2CH_2$—), isopropyl ($CH_2CH(CH_3)$—) or ethoxyethane ($CH_2CH_2OCH_2CH_2$—). In other words, for the sulfosuccinates derived from fatty alkanolamides or ethoxylated alkanolamides, these are most preferably monoethanolamine (MEA), monoisopropanolamine (MIPA) or diglycolamine (DGA) derived sulfosuccinates.

As the skilled reader will appreciate, for options (ii-a,b, c,d,e) and (iv) for the sulfosuccinate of formula (I) or formula (II), the value of x is the degree of alkoxylation, whilst for option (ii-d) and (ii-e) the combined value of x' and x" is the degree of alkoxylation. Preferably, x, x' and x" are each independently from 1 to 30, more preferably from 1 to 20, such as from 1 to 15, e.g. from 1 to 12. In one embodiment, therefore, x, x' and x" are each independently 1, 2, 3, 4, 5, 6, 7, 8, 9, 10, 11 or 12. It may be that x, x' and x" are each independently from 1 to 6 or alternatively it may be that x, x' and x" are each independently from 7 to 12.

In one embodiment, for options (ii-a,b,c,d,e) and (iv) for the sulfosuccinate of formula (I) or formula (II), the degree of alkoxylation is from 1 to 40, such as from 1 to 30 or from 1 to 24 or from 1 to 20 or from 1 to 12.

As the skilled reader will appreciate, the degree of alkoxylation can be measured by known techniques such as gel permeation chromatography.

In one embodiment, the sulfosuccinate of formula (I) or formula (II) is in accordance with option (ii-a) or option (iv), i.e. it is a sulfosuccinate derived from an ethoxylated fatty alcohol or terpene or is a sulfosuccinate derived from an ethoxylated fatty alkanolamide, and x is from 1 to 30, more preferably x is from 1 to 20, such as from 1 to 15, e.g. from 1 to 12 and most preferably from 1 to 10. In one embodiment, therefore, x is 1, 2, 3, 4, 5, 6, 7, 8, 9, or 10.

In another embodiment, the sulfosuccinate of formula (I) or formula (II) is in accordance with option (ii-b) or option (ii-c), i.e. it is a sulfosuccinate derived from a propoxylated fatty alcohol or terpene or is a sulfosuccinate derived from a butoxylated fatty alcohol or terpene, and x is from 1 to 20, such as from 1 to 15, e.g. from 1 to 12 and most preferably from 1 to 10. In one embodiment, therefore, x is 1, 2, 3, 4, 5, 6, 7, 8, 9, or 10.

In another embodiment, the sulfosuccinate of formula (I) or formula (II) is in accordance with option (ii-d) or option (ii-e), i.e. it is a sulfosuccinate derived from a block alkoxylated fatty alcohol or terpene, and x' and x" are each independently from 1 to 20, such as from 1 to 15, e.g. from 1 to 12 and most preferably from 1 to 10. In one embodiment, therefore, x' and x" are each independently 1, 2, 3, 4, 5, 6, 7, 8, 9, or 10.

In the sulfosuccinates of formula (I) and formula (II), the hydrocarbon group may be an unbranched C8 to C30 alkyl or alkenyl group. The skilled reader will appreciate that this fatty acid-derived group is a hydrophobic group. In one embodiment it may be a C8 to C29, C8 to C28, or C8 to C27 alkyl or alkenyl group. In one preferred embodiment, this hydrophobic group is a C9 to C26 alkyl or alkenyl group (e.g. C9 to C25, C9 to C24, or C9 to C23), preferably a C10 to C22 alkyl or alkenyl group (e.g. C10 to C21, or C10 to C20), more preferably a C11 to C20 alkyl or alkenyl group (e.g. C11 to C19, or C11 to C18). In one embodiment, the alkyl or alkenyl group has a C12 to C24 chain length (e.g. C12 to C22, or C12 to C20). Most preferably the alkyl or alkenyl group has a C12 to C18 chain length, i.e. it is a C12, C13, C14, C15, C16, C17, or C18 alkyl or alkenyl group.

The alkenyl group may have one, or more than one, carbon-carbon double bond, for example it may have one, two or three carbon-carbon double bonds.

In the sulfosuccinates of formula (I) and formula (II), for options (ii-a, b, c, d, e) the hydrocarbon group may be a C8 to C30 terpene group. The skilled reader will appreciate that this group is a hydrophobic group. The terpene group may be acyclic or cyclic.

In one embodiment the terpene group is a C8 to C22 terpene group, such as a C8 to C20 terpene group; preferably a C8 to C16 terpene group, such as a C9, C10, C11, C12, C13, C14 or C15 terpene group.

In one embodiment the terpene group may comprise a C10 acyclic, monocyclic or bicyclic terpene radical (e.g. geraniol, limonene, terpineol, linalool, pinene, carene, sabinene, camphene or thujene); a C15 acyclic, monocyclic, bicyclic or tricyclic terpenene radical (e.g. farnesene, farnesol, zingiberene, humulene, caryophyllene, vetivazulene, guaiazulene, longifolene, copaene or patchoulol), or a C20 acyclic, monocyclic, bicyclic, tricyclic or tetracyclic terpene radical (e.g. cafestol, kahweol, cembrene, sclareol, lagochilin, labdane, stemarene, steviol, or taxadiene).

The terpene group may, in one embodiment, comprise a C8-C15 monocyclic or bicyclic terpene radical, which may optionally further comprise a C1-20 hydrocarbon divalent linking group, which links the cyclic radical to the alkoxylating groups. This C1-20 hydrocarbon divalent linking group may suitably be a C1-20 alkylene, C2-20 alkenylene, or C1-20 alkoxyene group, for example a C1-12 alkylene, C2-12 alkenylene, or C1-12 alkoxyene group, such as a C2-10 alkylene, C2-10 alkenylene, or C2-10 alkoxyene group; preferably a C2-8 alkylene, C2-8 alkenylene, or C2-8 alkoxyene group; more preferably a C2, C3, C4, C5 or C6 alkylene or alkoxyene group; most preferably a C2, C3, or C4 alkylene or alkoxyene group.

In one embodiment the terpene group comprises a bicyclo [a,b,c,]heptenyl or bicyclo[a,b,c]heptyl radical, wherein a+b+c=5 and a=2, 3, or 4; b=2 or 1; and c=0 or 1. The terpene group in this embodiment may further comprise a C1-20 hydrocarbon divalent linking group, which links the cyclic radical to the alkoxylating groups. This C1-20 hydrocarbon divalent linking group may suitably be a C1-20 alkylene, C2-20 alkenylene, or C1-20 alkoxyene group, for example a C1-12 alkylene, C2-12 alkenylene, or C1-12 alkoxyene group, such as a C2-10 alkylene, C2-10 alkenylene, or C2-10 alkoxyene group; preferably a C2-8 alkylene, C2-8 alkenylene, or C2-8 alkoxyene group; more preferably a C2, C3, C4, C5 or C6 alkylene or alkoxyene group; most preferably a C2, C3, or C4 alkylene or alkoxyene group.

Thus the terpene group may, for example, be of formula Z—Y— in which Z represents a bicyclo[a,b,c,]heptenyl or bicyclo[a,b,c]heptyl radical, wherein a+b+c=5 and a=2, 3, or 4; b=2 or 1; and c=0 or 1; and Y represents —CH$_2$—C(R$^{20}$)(R$^{21}$)— or —O—CH(R$^{22}$)—CH(R$^{23}$)—, wherein R$^{20}$, R$^{21}$, R$^{22}$, and R$^{23}$, which may be identical or different, represent hydrogen or a C1-8 (preferably C1-6 or C1-5) alkyl. Preferably, R$^{20}$, R$^{21}$, R$^{22}$, and R$^{23}$, which may be identical or different, represent hydrogen or a C1, C2, C3 or C4 alkyl. Most preferably R$^{20}$, R$^{21}$, R$^{22}$, and R$^{23}$, which may be identical or different, represent hydrogen or a C1 or C2 alkyl.

These described options for the terpene group apply for the sulfosuccinates of formula (I) and formula (II) for any of options (ii-a, b, c, d, e). In one such embodiment, the described options for the terpene group apply and the sulfosuccinates of formula (I) and formula (II) are based on option (ii-a), (ii-b), or (ii-d), for example option (ii-d).

In one such embodiment, therefore, the sulfosuccinate is derived from a block alkoxylated terpene, and the R group in the sulfosuccinate of formula (I) or formula (II) is an alkoxylated terpene of the following formula:

Z—Y—[OCH(R$^{24}$)—CH(R$^{25}$)]$_n$—[OCH$_2$CH$_2$]$_m$— in which Z represents a bicyclo[a,b,c,]heptenyl or bicyclo[a,b,c]heptyl radical, wherein a+b+c=5 and a=2, 3, or 4; b=2 or 1; and c=0 or 1; Y represents CH$_2$—C(R$^{20}$)(R$^{21}$)— or —O—CH(R$^{22}$)—CH(R$^{23}$)—, wherein R$^{20}$, R$^{21}$, R$^{22}$, and R$^{23}$, which may be identical or different, represent hydrogen or a C1-8 (preferably C1-6 or C1-4, more preferably C1 or C2) alkyl; R$^{24}$ and R$^{25}$, which may be identical or different, represent hydrogen or a C1 or C2 alkyl, provided that at least one of the radicals R$^{24}$ and R$^{25}$ is not hydrogen and provided that the total number of carbon atoms in the radicals R$^{24}$ and R$^{25}$ is 1 or 2; n is an integer from 0 to 20; and m is an integer from 1 to 50. The HLB of the alkoxylated terpene is preferably less than 10, such as 5 or less; preferably from 1 to 5 and more preferably from 3 to 5

This type of terpene product is, for example, described in US Patent Publication No: 2006/0135683 and in WO 2009/023724.

In one such embodiment, Z represents a bicyclo[a,b,c,]heptenyl or bicyclo[a,b,c]heptyl radical, wherein a+b+c=5 and a=2, 3, or 4; b=2 or 1; and c=0 or 1; Y represents —CH$_2$—CH$_2$— or —O—CH$_2$—CH$_2$—; R$^{24}$ and R$^{25}$, which may be identical or different, represent hydrogen, CH$_3$ or C$_2$H$_5$, provided that at least one of the radicals R$^{24}$ and R$^{25}$ is not hydrogen and provided that the total number of carbon atoms in the radicals R$^{24}$ and R$^{25}$ is 1 or 2; n is an integer from 1 to 20; and m is an integer from 1 to 20.

Preferably, in this embodiment the R group of the sulfosuccinate of formula (I) or formula (II) is an alkoxylated terpene of the following formula:

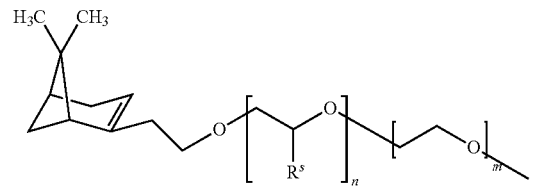

wherein R$^s$ is CH$_3$ or C$_2$H$_5$, n is an integer from 1 to 20 and m is an integer from 1 to 30. Most preferably, R$^s$ is CH$_3$, n is an integer from 1 to 20 and m is an integer from 1 to 20. For example, it may be that be is CH$_3$, n is an integer from 1 to 10 and m is an integer from 1 to 10.

Accordingly, in one embodiment it is preferred that the R group of the sulfosuccinate of formula (I) or formula (II) is a block alkoxylated terpene derived from 6,6-dimethylbicyclo[3.1.1]hept-2-ene-2-ethanol (CAS No: 128-50-7).

In this embodiment, the R group of the sulfosuccinate of formula (I) or formula (II) is suitably a block alkoxylated (PO)(EO) terpene derived from 6,6-dimethylbicyclo[3.1.1]hept-2-ene-2-ethanol (CAS No: 128-50-7). The number of propoxy groups is preferably from 1 to 20 (e.g. from 1 to 10) and the number of ethoxy groups is preferably from 1 to 20 (e.g. from 1 to 10). The HLB of the alkoxylated terpene is preferably less than 10, such as 5 or less; preferably from 1 to 5 and more preferably from 3 to 5.

When the sulfosuccinate is made up of units of formula (III) and/or (IV), the degree of polymerisation is preferably from 1 to 5, such as from 1 to 4. The degree of polymerisation is preferably from 1 to 3, more preferably from 1 to 2, for example from 1.1 to 1.8 or from 1.1 to 1.7, such as from 1.2 to 1.6, typically from 1.2 to 1.5. However, for these alkyl polyglucoside derived products, the polyglucoside may in one embodiment have a degree of polymerisation of from 1 to 15, and preferably from 1 to 10, e.g. from 1 to 9, from 1 to 8, from 1 to 7 or from 1 to 6.

As the skilled reader will appreciate, the degree of polymerisation can be measured by known techniques such as gel permeation chromatography.

The alkyl groups R in formula (III) and (IV) are C8 to C30 branched or unbranched alkyl groups, such as C8 to C25 branched or unbranched alkyl groups; preferably C8 to C22 branched or unbranched alkyl groups, e.g. C9 to C20 branched or unbranched alkyl groups, more preferably C10 to C18 branched or unbranched alkyl groups, e.g. C10 to C16 branched or unbranched alkyl groups.

This type of alkylpolyglucoside sulfosuccinate is, for example, described in U.S. Pat. No. 7,087,571.

It may be that the alkyl groups R in formula (III) and (IV) are C12 to C30 branched or unbranched alkyl groups, such as C12 to C25 or C12 to C25, preferably C12 to C24 branched or unbranched alkyl groups. In one embodiment the alkyl groups R in formula (III) and (IV) are C12 to C22 branched or unbranched alkyl groups, such as C12 to C20 branched or unbranched alkyl groups, more preferably C12 to C18 branched or unbranched alkyl groups, e.g. C12 to C16 branched or unbranched alkyl groups.

In one embodiment, the alkyl polyglucoside sulfosuccinate is based on decyl polyglucoside or lauryl polyglucoside. In one such embodiment, the alkyl polyglucoside sulfosuccinate is based on lauryl polyglucoside.

In one embodiment, the sulfosuccinate is of formula (I) or (II) and the hydrocarbon group is an unbranched C10 to C24 alkyl or alkenyl group or a C8 to C24 terpene group, or the sulfosuccinate is made up of units of formula (III) and/or (IV) and R is a C10 to C24 alkyl group. In one embodiment, the sulfosuccinate is of formula (I) or (II) and the hydrocarbon group is an unbranched C10 to C22 alkyl or alkenyl group or a C10 to C22 terpene group, or the sulfosuccinate is made up of units of formula (III) and/or (IV) and R is a C10 to C22 alkyl group.

In one embodiment, the sulfosuccinate is of formula (I) or (II) and the hydrocarbon group is an unbranched C10 to C24 alkyl or alkenyl group or a C8 to C24 terpene group, or the sulfosuccinate is made up of units of formula (III) and/or (IV) and R is a C12 to C24 alkyl group. In one embodiment, the sulfosuccinate is of formula (I) or (II) and the hydrocarbon group is an unbranched C10 to C22 alkyl or alkenyl group or a C8 to C22 terpene group, or the sulfosuccinate is made up of units of formula (III) and/or (IV) and R is a C12 to C22 alkyl group.

In one embodiment, the sulfosuccinate is of formula (I) or (II) and the hydrocarbon group is an unbranched C12 to C24 alkyl or alkenyl group or a C9 to C24 terpene group, or the sulfosuccinate is made up of units of formula (III) and/or (IV) and R is a C12 to C24 alkyl group. In one embodiment, the sulfosuccinate is of formula (I) or (II) and the hydrocarbon group is an unbranched C12 to C22 alkyl or alkenyl group or a C9 to C22 terpene group, or the sulfosuccinate is made up of units of formula (III) and/or (IV) and R is a C12 to C22 alkyl group. It may be that the sulfosuccinate is of formula (I) or (II) and the hydrocarbon group is an unbranched C12 to C18 alkyl or alkenyl group or a C9 to C15 terpene group, or the sulfosuccinate is made up of units of formula (III) and/or (IV) and R is a C12 to C18 alkyl group.

In all of the above formulae, the cation M is suitably selected from alkali metal ions (e.g. sodium or potassium), alkaline earth metal ions (e.g. calcium or magnesium), ammonium ions, and alkanolammonium ions. In one embodiment, the cation M is selected from alkali metal ions, ammonium ions, and alkanolammonium ions. In one such embodiment, M is a sodium, potassium, ammonium, monoethanolammonium or triethanolammonium ion. Preferably, M is sodium or potassium, most preferably sodium.

In one preferred embodiment, the sulfosuccinate is of formula (I), i.e. it is a monoester (or half ester) type of sulfosuccinate.

In one such preferred embodiment, the sulfosuccinate is of formula (I) and:
  M is a sodium, potassium, ammonium, monoethanolammonium or triethanolammonium ion;
  the hydrocarbon group is an unbranched C10 to C22 alkyl or alkenyl group (such as C10 to C20 alkyl or alkenyl) or a C8 to C22 terpene group (such as a C8 to C20 terpene group) (for options (ii-a,b,c,d,e));
  for options (iii) and (iv), $R^a$ is ethyl, isopropyl or ethoxyethane; and
  for options (ii-a,b,c,d,e) and (iv) x and x' and x" are each independently selected from 1 to 30 (such as from 1 to 20).

In one such preferred embodiment, the sulfosuccinate is of formula (I) and:
  M is a sodium, potassium, ammonium, monoethanolammonium or triethanolammonium ion;
  the hydrocarbon group is an unbranched C10 to C22 alkyl or alkenyl group (such as C10 to C20 alkyl or alkenyl) or a C8 to C15 terpene group (for options (ii-a,b,c,d,e));
  for options (iii) and (iv), $R^a$ is ethyl, isopropyl or ethoxyethane; and
  for options (ii-a,b,c,d,e) and (iv) x and x' and x" are each independently selected from 1 to 30 (such as from 1 to 20).

In one such preferred embodiment, the sulfosuccinate is of formula (I) and:
  M is sodium or potassium;
  the hydrocarbon group is an unbranched C12 to C18 alkyl or alkenyl group or a C9 to C15 terpene group (for options (ii-a,b,c,d,e));
  for options (iii) and (iv) $R^a$ is ethyl, isopropyl or ethoxyethane; and
  for options (ii-a,b,c,d,e) and (iv) x and x' and x" are each independently selected from 1 to 20 (such as from 1 to 15).

In one such preferred embodiment, the sulfosuccinate is of formula (I) and:
  M is sodium;
  the hydrocarbon group is an unbranched C12 to C18 alkyl or alkenyl group;
  for options (iii) and (iv) $R^a$ is ethyl, isopropyl or ethoxyethane; and
  for options (ii-a,b,c,d,e) and (iv) x and x' and x" are each independently selected from 1 to 15 (such as from 1 to 12).

In another such preferred embodiment, the sulfosuccinate is of formula (I), options (ii-a,b,c,d or e) and:
  M is sodium;
  the hydrocarbon group is a C9 to C15 terpene group; and
  x and x' and x" are each independently selected from 1 to 15 (such as from 1 to 12).

In one preferred embodiment, the sulfosuccinate is made up of units of formula (III) and/or (IV), i.e. it is an alkyl polyglucoside derived sulfosuccinate. In one such embodiment, the sulfosuccinate is of formula (III) and/or (IV) and M is a sodium, potassium, ammonium, monoethanolammonium or triethanolammonium ion; the R group is a branched or unbranched C8 to C25 alkyl group (such as C10 to C22 alkyl); and the degree of polymerisation is from 1 to 10 (such as from 1 to 5 or from 1 to 4). In another such embodiment, the sulfosuccinate is of formula (III) and/or (IV) and M is a sodium, potassium, ammonium, monoethanolammonium or triethanolammonium ion; the R group is a branched or unbranched C12 to C25 alkyl group (such as C12 to 24 alkyl or C12 to C20 alkyl); and the degree of polymerisation is from 1 to 10 (such as from 1 to 5 or from 1 to 4). In another such embodiment, the sulfosuccinate is of formula (III) and/or (IV) and M is sodium or potassium; the R group is a branched or unbranched C12 to C24 alkyl group (such as C12 to C18 alkyl); and the degree of polymerisation is from 1 to 5 (such as from 1 to 4 or from 1 to 3 or from 1 to 2).

In one preferred embodiment, the sulfosuccinate is of formula (III) and/or (IV) and:
  M is a sodium, potassium, ammonium, monoethanolammonium or triethanolammonium ion;
  the R group is a branched or unbranched C8 to C25 alkyl group (such as C10 to C22 alkyl);
  the degree of polymerisation is from 1 to 5, e.g. from 1 to 3 (such as from 1 to 2).

In one such preferred embodiment, the sulfosuccinate is of formula (III) and/or (IV) and:
  M is sodium or potassium;
  the R group is a branched or unbranched C8 to C20 alkyl group (such as C10 to C18 alkyl);
  the degree of polymerisation is from 1 to 5, e.g. from 1 to 2 (such as from 1.1 to 1.8).

In one such preferred embodiment, the sulfosuccinate is of formula (III) and/or (IV) and:
M is sodium;
the R group is a branched or unbranched C10 to C18 alkyl group (such as C10 to C16 alkyl);
the degree of polymerisation is from 1 to 5, e.g. from 1.1 to 1.8 (such as from 1.2 to 1.5).

In one such preferred embodiment, the sulfosuccinate is of formula (III) and/or (IV) and:
M is sodium;
the R group is a branched or unbranched C12 to C18 alkyl group (such as C12 to C16 alkyl);
the degree of polymerisation is from 1 to 5, e.g. from 1.1 to 1.8 (such as from 1.2 to 1.5).

In one embodiment, the sulfosuccinate is selected from: disodium ricinoleamido MEA sulfosuccinate; disodium oleamido MEA sulfosuccinate; disodium oleamido MIPA sulfosuccinate; disodium cocamido MIPA sulfosuccinate; disodium laureth sulfosuccinate; disodium PEG 12 dimethicone copolyol sulfosuccinate (as disclosed in WO2007106355); disodium oleth 9 sulfosuccinate; disodium sulfosuccinate lauryl glucoside crosspolymer; and terpene block alkoxylated half ester sulfosuccinates (e.g. an (EO)(PO) block alkoxylated terpene half ester sulfosuccinate, preferably based on a terpene alkoxylate with an HLB of less than 10, more preferably from 3 to 5, such as one with a C9 terpene).

In one embodiment, the sulfosuccinate is selected from: disodium ricinoleamido MEA sulfosuccinate; disodium oleamido MEA sulfosuccinate; disodium oleamido MIPA sulfosuccinate; disodium cocamido MIPA sulfosuccinate; disodium laureth sulfosuccinate; disodium PEG 12 dimethicone copolyol sulfosuccinate (as disclosed in WO2007106355); and disodium oleth 9 sulfosuccinate.

In one embodiment, the sulfosuccinate has an HLB (hydrophilic-lipophilic balance) value of from 0 to 7, such as from 0.5 to 6.5 or from 1 to 6; preferably the HLB value is from 1 to 5, such as from 2 to 4 or from 3 to 5 or from 3 to 4. The skilled reader will appreciate that HLB values can be determined by the use of H-NMR, which allows a HLB value to be calculated by integration of the H-signals from the lipophilic and hydrophilic parts of the molecule.

In one embodiment, the sulfosuccinate has a molecular weight of greater than 700 Da. This can be beneficial for some applications, as it means they would be classified as non bio-accumulating. However, in an alternative embodiment, the sulfosuccinate has a molecular weight of 700 Da or less.

It may be that the sulfosuccinate has a molecular weight of from 300 to 1600 Da, such as from 350 to 1600 Da, or from 400 to 1550 Da, or from 450 to 1500 Da.

In one embodiment, the sulfosuccinate has a molecular weight of greater than 700 Da and less than or equal to 1600 Da. In one such embodiment, the sulfosuccinate has a molecular weight of from 705 to 1600 Da, such as from 710 to 1500 Da, or from 715 to 1400 Da, or from 720 to 1300 Da.

In another embodiment, the sulfosuccinate has a molecular weight of from 300 to 700 Da, such as from 350 to 675 Da or from 400 to 650 Da.

The sulfosuccinates used in the invention can be prepared using conventional methods. In particular, sulfosuccinates used in the invention can be prepared by reacting a fatty alkanolamide, alkoxylated fatty alkanolamide, fatty alcohol, alkoxylated fatty alcohol or alkoxylated terpene alcohol with maleic anhydride to form an intermediate, which is then reacted with a bisulfite (e.g. sodium or potassium bisulfite) to form the sulfosuccinate. A monoester product is obtained by using one equivalent of the fatty alkanolamide, alkoxylated fatty alkanolamide, fatty alcohol, alkoxylated fatty alcohol or alkoxylated terpene alcohol in the reaction with the maleic anhydride, whist two equivalents of this starting material would be used for a diester product. Synthesis of sulfosuccinates derived from alkyl polyglucosides is described in U.S. Pat. No. 7,087,571.

The skilled reader will appreciate that the starting raw materials for these syntheses are readily available. Additionally, many of the sulfosuccinate surfactants are commercially available and reaction chemistries are well known, as well as manufacturing routes being described in text books on surfactants. Synthesis of alkyl polyglucosides is well known and can be found in any text book covering such surfactants, e.g. Alkyl Polyglucosides: Technology, Properties and Applications, eds K Hill, W von Rybinski and G Stoll (Wiley, (1996)).

The amount of sulfosuccinate used may be any suitable amount to reduce or inhibit corrosion of the metal component. In one embodiment it may be used at a level of 1 ppm or more with respect to the aqueous fluid, such as from 1 ppm to 1000 ppm, e.g. from 1 ppm to 500 ppm. It may be that the amount of sulfosuccinate is from 2 to 200 ppm, such as from 3 to 150 pmm or from 4 to 100 ppm. In one embodiment, the amount of sulfosuccinate is from 5 to 50 ppm, such as from 10 to 40 ppm or from 15 to 30 ppm.

The sulfosuccinate may be used in the same manner as a conventional corrosion inhibitor.

The sulfosuccinate may suitably be used to inhibit corrosion of a metal component in an industrial aqueous system, where the metal component is (or will be) in contact with an aqueous fluid.

The industrial aqueous system may, in one embodiment, be an aqueous system in a hydrocarbon plant; this may be a plant for exploration, recovery, refining or distribution of hydrocarbon. For example, the aqueous system may be an oil or gas plant. In one such embodiment the aqueous system is an oilfield system, such as an oilfield production system or an oilfield distribution system. In another such embodiment the aqueous system is a downstream oil-related system, such as an oil refining system. Preferred industrial aqueous systems may be aqueous systems in topside oilfield locations.

The industrial aqueous system may in an alternative embodiment be an aqueous system in a chemical plant, e.g. a chemical manufacturing, processing or distribution plant.

The industrial aqueous system may in another alternative embodiment be a water plant, e.g. an industrial water treatment or distribution system.

The industrial aqueous system may in another alternative embodiment be a paper manufacturing plant.

In one embodiment, the aqueous fluid is at a temperature of 100° C. or less, such as 90° C. or less, e.g. 80° C. or less, or 70° C. or less, or 60° C. or less.

The aqueous fluid may be flowing or may be stationery. Thus the aqueous fluid may, for example, be in a pipe or other conduit or may be in a tank or other storage container.

The metal component may therefore be a pipe or other conduit or may be a tank or other storage container.

The aqueous fluid may be acidic, neutral or basic. In one embodiment the aqueous fluid has, or will have, acidic conditions, i.e. a pH of less than 7.

In one embodiment, the aqueous fluid comprises water and further comprises, or will further comprise, one or more acidifying compounds, such as carbon dioxide or hydrogen sulphide.

In one embodiment, the aqueous fluid comprises water and a hydrocarbon, such as oil, and further comprises, or will further comprise, one or more acidifying compounds, such as carbon dioxide or hydrogen sulphide.

The metal component may comprise any metal that is prone to corrode following a time of exposure to an aqueous fluid, especially an acidic aqueous fluid. It may comprise a metal alloy or a single metal. The metal component may in particular comprise ferrous materials (e.g. steel), copper, and/or aluminium.

In one embodiment the metal component comprises steel, such as mild steel, carbon steel, stainless steel (including precipitation-hardened stainless steel), chrome steel, duplex steel, martensitic alloy steel, ferritic alloy steel, austenitic stainless steel, or high nickel content steel.

The sulfosuccinate may be applied to the metal component and/or may be added to the aqueous fluid. In one embodiment the sulfosuccinate is added to the aqueous fluid.

The sulfosuccinate may be applied to the metal component before the metal component is in contact with the aqueous fluid and/or may be applied once the metal component is in contact with the aqueous fluid.

The sulfosuccinate may be added to the aqueous fluid before the aqueous fluid is in contact with the metal component and/or may be added to the aqueous fluid once the aqueous fluid is in contact with the metal component.

The sulfosuccinate may be used with one or more additional components. These additional components may have been pre-mixed with the sulfosuccinate, or may be added simultaneously with the sulfosuccinate, or sequentially with the sulfosuccinate, or separately from the sulfosuccinate. They may be added before the sulfosuccinate or after the sulfosuccinate.

The additional components may, for example, be selected from: corrosion inhibitors that are not sulfosuccinates; surfactants; solvents; demulsifiers; antifoam agents; scale inhibitors; dispersants; and biocides.

When a corrosion inhibitor that is not a sulfosuccinate is used as an additional component, the corrosion inhibitor that is not a sulfosuccinate may be selected from non-ionic, anionic, cationic and amphoteric corrosion inhibitors. It may, for example, be selected from: sodium tripolyphosphate, sodium ethylenediamine tetracetate, sodium nitrilo triacetate, tetra potassium pyrophosphate, acetodiphosphonic acid and its salts, ammonium trismethylene phosphonic acid and its salts, ethylenediamine tetrakis (methylene phosphonic) acid and its salts, diethylenetriamine pentakis (methylene phosphonic) acid, hexamethylenediamine tetrakis (methylene phosphonic) acid, bishexamethylenetriamine pentakis (methylene phosphonic) acid, and ethanolamine bis(methylenephosphonic) acid and its salts.

In one embodiment, the corrosion inhibitor that is not a sulfosuccinate is an amphoteric corrosion inhibitor, such as an inhibitor selected from alkylamidopropyl betaines, alkylamidopropyl sultaines, alkyl ampho(di)acetates, and alkyl amphohydroxypropyl sulfonates and propionates, which may be based on lauric acid, coconut oil, palm oil, oleic acid, castor oil, tall oil or ricinoleic acid.

In one embodiment, the corrosion inhibitor that is not a sulfosuccinate is a non-ionic corrosion inhibitor, such as an inhibitor selected from fatty diamine derivatives of oleic or tall oil fatty acids, and fatty acid alkanolamides such as monoisopropyl oleamide.

In one embodiment, the corrosion inhibitor that is not a sulfosuccinate is an anionic corrosion inhibitor, such as an inhibitor selected from alkyl and alkyl ether phosphate esters, acyl sarcosinates, taurides and alkyl ether carboxylic acids.

In one embodiment, the corrosion inhibitor that is not a sulfosuccinate is a cationic corrosion inhibitor, such as an inhibitor selected from quaternary ammonium salts, such as alkyl trimethyl ammonium halides or benzalkonium derivatives, fatty amines, amidoamines (including alkylamidopropyl amines and imidazolines). For example, it may be an alkyl hydroxyethyl or alkyl aminoethyl derivative of oleic or tall oil fatty acids.

When a surfactant is used as an additional component, the surfactant may be a cationic surfactant (for example it may be selected from benzalkonium salts, C10-20 alkyl trimethyl ammonium salts, and C10-20 alkyl trimethyl or tris (hydroxymethyl) phosphonium salts).

Alternatively, the surfactant may be anionic (for example it may be selected from C10-20 alkyl benzene sulphonates, C10-20 olefin sulphonates, C10-20 alkyl sulfates, C10-20 alkyl 1 to 25 mole ether sulfates, C10-20 paraffin sulphonates, C10-20 alkyl phenol sulfates, lignin sulphonates, fatty ester sulphonates, C10-20 alkyl phenol ether sulfates, C10-20 alkyl ethanolamide sulfates, and C10-20 alpha sulphofatty acid salts).

The surfactant might also be amphoteric (for example it may be selected from betaines, sulphobetaines, and quaternized imidazoline).

The surfactant might alternatively be non-ionic (for example it may be selected from ethoxylated fatty acids, ethoxyl/propyleneoxy block copolymers, ethoxylated fatty amines, mono- and di-alkanolamides, amine oxides and C10-20 acyl sorbitan and glyceryl ethoxylates).

When a solvent is used as an additional component, the solvent may be aqueous or may be organic. The solvent may be any suitable solvent that is compatible with the aqueous fluid. Examples of solvents include water, dimethyl sulfoxide (DMSO), alkylene glycols, glycol ethers, and tetrahydrofuran (THF).

A demulsifier may, in particular, be beneficial as an additional component when the sulfosuccinate is being used in oilfield applications. Examples of demulsifers include phenol-formaldehyde resins; polyamines; di-epoxides; and polyols.

When an antifoam agent is used as an additional component, the antifoam agents that may be considered include silicone defoamers and acetylenic diols.

When a scale inhibitor is used as an additional component, the scale inhibitor may, for example, be selected from polyacrylates; polymaleates; polysulfonates; phosphonates; and bisphosphonates.

When a dispersant is used as an additional component, the dispersant may, for example, be selected from polymaleic acids, polyacrylic acids and polyvinylsulphonic acids.

When a biocide is used as an additional component, the biocide may, for example, be a quaternary ammonium or phosphonium compound, such as an ADBAC quaternary ammonium compound, or a tetrakis (hydroxymethyl) phosphonium salt, or formaldehyde glutaraldehyde.

The corrosion inhibitor formulation of the third aspect may be used in the inventions of the first or second aspect. Alternatively, the inventions of the first and second aspect may add or apply sulfosuccinates and any additional corrosion inhibitors separately. Alternatively, the inventions of the first and second aspect may use only sulfosuccinates as the corrosion inhibitor.

The corrosion inhibitor formulation of the third aspect may comprise a sulfosuccinate together with a corroinhibitor that is not a sulfosuccinate, wherein this corrosion inhibitor is selected from non-ionic, anionic, cationic and amphoteric corrosion inhibitors.

The corrosion inhibitor formulation may in one embodiment comprise from 10 to 99 wt % sulfosuccinate, such as from 50 to 95 wt % sulfosuccinate. The corrosion inhibitor formulation may in one embodiment comprise from 1 to 90 wt % of corrosion inhibitor that is not a sulfosuccinate such as from 5 to 50 wt % of corrosion inhibitor that is not a sulfosuccinate.

The formulation may further include additional components, which may for example be selected from: surfactants; solvents; demulsifiers; antifoam agents; scale inhibitors, dispersants, and biocides. These components are discussed in more detail above.

The invention will now be further described, in a non-limiting manner, with reference to the following Examples.

EXAMPLES

Example 1

Linear Polarisation Resistance (LPR) Test

A modified version of the bubble test was used to compare the corrosion inhibition performance of various sulfosuccinates to the industry standard corrosion inhibitor, tall oil aminoethyl imidazole, under oilfield conditions.

The sulfosuccinates tested were:
Disodium ricinoleamido MEA sulfosuccinate
Disodium oleamido MEA sulfosuccinate
Disodium oleamido MIPA sulfosuccinate
Disodium cocamido MIPA sulfosuccinate
Disodium laureth sulfosuccinate
Disodium PEG 12 dimethicone sulfosuccinate
Disodium oleth 9 sulfosuccinate Method
- Each cell was charged with the desired weight of brine and oil.
- Every cell had a stirring bar, auxiliary electrode, reference electrode, gas sparge tube, and glass periscope inserted.
- The cells were placed in a water bath set at 60° C. and set to stir at approximately 300 rpm.
- Each cell was connected to a constant sparge of $CO_2$ and then left for 1 hour to reach equilibrium.
- C1018 mild steel coupons were washed with xylene and acetone to remove any vapour phase corrosion inhibitor and allowed to dry.
- After the cells reached equilibrium, the mild steel coupons were connected to the working electrodes and inserted into each cell using the glass periscopes (to avoid getting the electrode oil wet).
- The LPR run was started and baseline corrosion data was collected for approximately 2.5 hours.
- During this time 20000 ppm w/w active stock solutions of the sulfosuccinates and the tall oil aminoethyl imidazole were made up. The sulfosuccinates were made up in a 5% NaCl brine. The tall oil aminoethyl imidazole was made up in isoparaffin fluid Isopar™ M, because it is not water soluble.
- After the baseline corrosion data was collected the stock solutions were injected into the cells at a concentration of 20 ppm actives and the corrosion rate in each cell was recorded for a further 12.5 hours.

Corrosion efficiency was also calculated as $$\frac{[\text{Baseline corrosion} - \text{corrosion at 15 hours}] \times 100}{\text{Baseline corrosion}}$$

where baseline corrosion was calculated by taking the average corrosion rate of each cell before the corrosion inhibitors were introduced.

A summary of the conditions for the LPR test is shown in Table 1.

TABLE 1

Tabulated LPR Conditions

| Condition | Description |
| --- | --- |
| Brine | 5% NaCl |
| Oil phase | Isopar M |
| Brine Oil Ratio | 9:1 |
| Temperature | 60° C. |
| Gas Sparge | Constant $CO_2$ |
| Stirring speed | ~300 rpm |
| Working electrode | Mild Steel C1018 |
| Reference electrode | Ag/AgCl (saturated in KCl) |
| Auxiliary electrode | Platinum |
| Inhibitor Concentration | 20 ppm actives |
| Test period | 15 hours |

Results and Discussion

The results are shown in FIG. 2 (corrosion rate) and FIG. 3 (corrosion efficiency). In FIG. 2 it can be seen that some of the sulfosuccinate based inhibitors form a protective film around the working electrode quicker than the industry standard (tall oil aminoethyl imidazole). It can be seen from FIG. 2 that, under oilfield conditions, all of the sulfosuccinates tested reduce the observed corrosion rates. FIG. 3 shows that all of the sulfosuccinates tested have good corrosion efficiencies.

Disodium ricinoleamido MEA sulfosuccinate, disodium oleamido MIPA sulfosuccinate, disodium cocamido MIPA sulfosuccinate and disodium laureth sulfosuccinate all significantly reduce the corrosion rate and have a performance very similar to the industry standard (tall oil aminoethyl imidazoline).

Disodium laureth sulfosuccinate is a short chain ethoxylated (3 mole) alkyl sulfosuccinate, while the other three are all alkyl amido sulfosuccinates. Disodium ricinoleamido MEA sulfosuccinate and disodium oleamido MIPA sulfosuccinate have long chain hydrophobic alkyl groups whilst disodium cocamido MIPA sulfosuccinate has a shorter hydrophobic alkyl chain.

Disodium oleth 9 sulfosuccinate and disodium oleamido MEA sulfosuccinate also significantly reduce corrosion rates, although they do not perform quite as well as the industry standard.

Disodium oleth 9 sulfosuccinate is an ethoxylated (9 mole) long chain sulfosuccinate and disodium oleamido MEA sulfosuccinate is a long chain alkyl amido sulfosuccinate.

The difference in performance observed between disodium laureth sulfosuccinate and disodium oleth 9 sulfosuccinate could be due to the higher degree of ethoxylation making the molecule bigger and therefore less able to effectively form a protective film on the surface of the metal coupon. However, the effects are still good and a larger molecular weight will reduce bioaccumulation. Disodium oleth 9 sulfosuccinate has a molecular weight of >700 Da and so would not be considered to bioaccumulate. Therefore in at least some situations the advantage of non-bioaccumulation would be considered to outweigh the slight reduction in effectiveness as a corrosion inhibitor.

Disodium oleamido MEA sulfosuccinate would be expected to have a very similar performance to disodium oleamido MIPA sulfosuccinate, due to the similar chemistry, but it appears that the variation in the starting alkanolamine may lead to a slightly poorer performance, although still well within acceptable bounds.

Disodium PEG 12 dimethicone sulfosuccinate provides the lowest level of corrosion protection and is a long chain sulfosuccinate derived from a silicon copolymer. Its lower performance may be caused by its very large size (it is classified as a polymer) reducing its ability to effectively form a protective film on the surface of the metal coupon. Again, however, in at least some situations the advantage of non-bioaccumulation might be considered to outweigh the reduction in effectiveness as a corrosion inhibitor.

Example 2

Static acid Immersion Tests

Static acid immersion tests were used to compare the corrosion inhibition performance of various sulfosuccinates in 5% w/w HCl to the industry standard propargyl alcohol (2-propyn-1-ol) and the corrosion inhibitor Stannine® ETH, which is a blend of amine salts and aliphatic alcohols and is available from Rhodia Novecare.

Method

A control solution of 5% w/w HCl was prepared by diluting 37% w/w HCl with deionised water.

An inhibited solution of 5% w/w HCl & 2000 ppm w/w active corrosion inhibitor was then prepared for each of the corrosion inhibitors being evaluated. Stannine® ETH was used at 2000 ppm w/w solids as the active content of Stannine® ETH is unknown.

Each solution was then split evenly between 2 Schott bottles (for duplicate runs) and a pre-weighed C1018 mild steel coupon was placed in each so that it was completely submerged.

The Schott bottles were then sealed tightly and stored for 24 hours in an oven set at 50° C.

After the allotted time the coupons were removed from the oven and cleaned using deionised water, HCl cleaning solution and acetone. The HCl cleaning solution had been made by dissolving 5 g $SnCl_2$ and 2 g $SbCl_3$ in 100 ml of 37% w/w HCl.

The coupons were then oven dried before re-weighing with the average weight change of the duplicate coupons being used to calculate the corrosion rate.

The above process was then repeated using (a) 5% w/w $H_2SO_4$ and (b) 5% w/w acetic acid instead of HCl.

Results

Results for the static HCl, $H_2SO_4$ and acetic acid immersion tests can be found in Tables 2A-C respectively.

TABLE 2A

Sulfosuccinate corrosion inhibitors performance in 5% HCl Carbon Steel (C1018) stored in a 5% w/w HCl solution at 50° C. for 24 hours

| Product | Corrosion rate (mils/y) | % Efficiency |
|---|---|---|
| No Inhibitor | 1423.4 | # |
| Propargyl alcohol | 9.5 | 99.3 |
| Stannine ® ETH | 9.3 | 99.3 |
| Disodium ricinoleamido MEA sulfosuccinate | 221.4 | 84.4 |
| Disodium oleamido MEA sulfosuccinate | 171.5 | 88.0 |
| Disodium oleamido MIPA sulfosuccinate | 163.3 | 88.5 |

TABLE 2B

Sulfosuccinate corrosion inhibitors performance in 5% $H_2SO_4$ Carbon Steel (C1018) stored in a 5% w/w $H_2SO_4$ solution at 50° C. for 24 hours

| Product | Corrosion rate (mils/y) | % Efficiency |
|---|---|---|
| No Inhibitor | 1921.3 | # |
| Propargyl alcohol | 1575.2 | 18.0 |
| Stannine ® ETH | 476.2 | 75.2 |
| Disodium ricinoleamido MEA sulfosuccinate | 362.5 | 81.1 |
| Disodium oleamido MEA sulfosuccinate | 669.3 | 65.2 |
| Disodium oleamido MIPA sulfosuccinate | 607.0 | 68.4 |

TABLE 2C

Sulfosuccinate corrosion inhibitors performance in 5% acetic acid Carbon Steel (C1018) stored in a 5% w/w Acetic acid solution at 50° C. for 24 hours

| Product | Corrosion rate (mils/y) | % Efficiency |
|---|---|---|
| No Inhibitor | 140.2 | # |
| Stannine ® ETH | 95.4 | 32.0 |
| Disodium ricinoleamido MEA sulfosuccinate | 32.0 | 77.2 |
| Disodium oleamido MEA sulfosuccinate | 60.7 | 56.7 |
| Disodium oleamido MIPA sulfosuccinate | 40.9 | 70.9 |

In 5% HCl (Table 2A) it is clear that the industry standard Propargyl alcohol and Stannine® ETH are superior to the alkyl amidosulfosuccinates as they obtain efficiencies over 99% where the alkyl amidosulfosuccinates obtain efficiencies of between 84.4% and 88.5%.

However, as propargyl alcohol has serious handling issues and the results for the alkyl amidosulfosuccinates are still good, it can be expected that there will be applications where the alkyl amidosulfosuccinates would be preferred as corrosion inhibitors.

None of the coupons, apart from the control (no inhibitor), showed any signs of pitting corrosion.

In 5% $H_2SO_4$ (Table 2B), disodium ricinoleamido MEA sulfosuccinate provides by far the best performance with an efficiency of 81.1%, with Stannine® ETH being the next most effective with an efficiency of 75.2%. The other sulfosuccinates tested also had a good effect on reducing corrosion. It is clear that propargyl alcohol is not a useful benchmark, not performing well as an inhibitor in this environment.

In 5% acetic acid (Table 2C) it can be seen that all the alkyl amido sulfosuccinates tested did all reduce the corrosion rates to a greater degree than Stannine® ETH.

Example 3

Linear Polarisation Resistance (LPR) Bubble Test

The same tests as described in Example 1 were carried out on the products set out in Table 3 below.

TABLE 3

| Product | Chemical name | Activity % |
|---|---|---|
| PolySugaMate L (from Colonial Chemicals) | Disodium sulfosuccinate lauryl glucoside crosspolymer (dp~4) | 38 (as solid) |
| Rhodoline HP half ester sulfosuccinate (from Rhodia Novecare) | Terpene (C9) block alkoxylated (EO) (PO) half ester sulfosuccinate where the terpene alkoxylate has an HLB in the range of from 3 to 5. | 35 |
| Mackterra TDI | Tall oil aminoethyl imidazoline | 100 |

Results and Discussion

The results are shown in FIGS. 4 and 5 (corrosion rate) and FIG. 6 (corrosion efficiency).

In FIG. 4 it can be seen that, under oilfield conditions, all of the sulfosuccinates tested reduce the observed corrosion rates.

FIG. 5 provides a direct comparison between the terpene block alkoxylated half ester sulfosuccinate and the industry standard (tall oil aminoethyl imidazoline). It can be seen that, over time, the anti-corrosion performance of the sulfosuccinate was comparable with or better than the industry standard.

FIG. 6 shows that both of the further sulfosuccinates tested had good corrosion efficiencies. The terpene block alkoxylated half ester sulfosuccinate had an efficiency of 99%, which was superior to the industry standard.

PolySugaMate D (disodium sulfosuccinate decyl glucoside crosspolymer, 38% activity as solid, dp~4, from Colonial Chemicals) was also tested but showed poorer corrosion rate and corrosion efficiency under the test conditions than PolySugaMate L.

CONCLUSION

These examples show that a wide range of sulfosuccinates exhibit corrosion inhibition properties for metal in an aqueous environment.

The invention claimed is:

1. A method of preventing or reducing corrosion of a metal component that is in contact with, or will be in contact with, an aqueous fluid, wherein the method comprises:
    applying a sulfosuccinate to a metal component or adding the sulfosuccinate to an aqueous fluid that is in contact with, or will be in contact with, the metal component
    wherein the sulfosuccinate is a reaction product of maleic anhydride and a compound selected from the group consisting of: a fatty alkanolamide, a fatty alkoxylated alkanolamide, a fatty alcohol, a fatty alkoxylated alcohol, an alkoxylated terpene group, and an alkyl polyglucoside, followed by reaction with a bisulfite;
    wherein the fatty group of the compound is a C8-30 unbranched alkyl or alkenyl group.

2. The method of claim 1 wherein the sulfosuccinate is of formula (I) or formula (II):

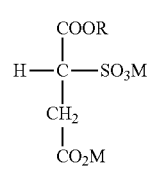

(I)

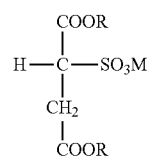

(II)

wherein

M is a monovalent or divalent cation; and

R is:

(i) a hydrocarbon group which is a C8-30 unbranched alkyl or alkenyl group; or (ii-a) R'—(O—$C_2H_4$)$_x$—, where R' is a hydrocarbon group which is a C8-30 unbranched alkyl or alkenyl group or a C8-C30 terpene group, and x is an integer from 1 to 50; or (ii-b) R'—(O—$C_3H_6$)$_x$—, where R' is a hydrocarbon group which is a C8-30 unbranched alkyl or alkenyl group or a C8-C30 terpene group, and x is an integer from 1 to 50; or (ii-c) R'—(O—$C_4H_8$)$_x$—, where R' is a hydrocarbon group which is a C8-30 unbranched alkyl or alkenyl group or a C8-C30 terpene group, and x is an integer from 1 to 50; or (ii-d) R'—(O—$C_yH_{2y}$)$_{x'}$(O—$C_2H_4$)$_{x''}$—, where R' is a hydrocarbon group which is a C8-30 unbranched alkyl or alkenyl group or a C8-C30 terpene group, y is 3 or 4, x' is an integer from 1 to 50, and x" is an integer from 1 to 50; or (ii-e) R'—(O—$C_2H_4$)$_{x'}$(O—$C_yH_{2y}$)$_{x'}$—, where R' is a hydrocarbon group which is a C8-30 unbranched alkyl or alkenyl group or a C8-C30 terpene group, y is 3 or 4, x' is an integer from 1 to 50, and x" is an integer from 1 to 50; or (iii) R'—(=O)—NH—$R^a$—, where R' is a hydrocarbon group which is a C8-30 unbranched alkyl or alkenyl group, and $R^a$ is a C1-C6 alkyl or C2-C6 alkoxyalkyl, or (iv) R'—(O—$CH_2$—$CH_2$)$_x$—C(=O)—NH—$R^a$—, where R' is a hydrocarbon group which is a C8-30 unbranched alkyl or alkenyl group, and $R^a$ is a C1-C6 alkyl or C2-C6 alkoxyalkyl, and x is an integer from 1 to 50;

or the (or each) sulfosuccinate is made up of units of formula (III) and/or (IV):

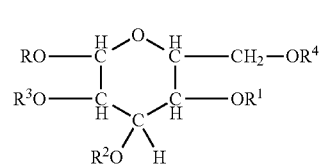

(III)

-continued

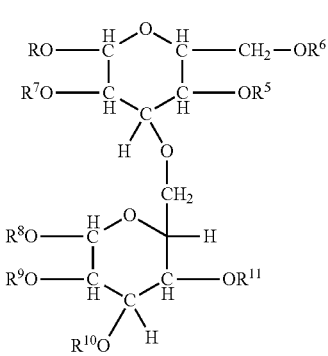

(IV)

wherein
R is a C8 to 30 alkyl group;
R¹, R², R³ and R⁴ are independently selected from the group consisting of hydrogen and —CH₂CH(OH)CH₂—R¹², with the proviso that R¹, R², R³ and R⁴ are not all hydrogen;
R⁵, R⁶, R⁷ R⁸, R⁹ and R¹¹ are independently selected from the group consisting of hydrogen and —CH₂CH(OH)CH₂—R¹²,
and R¹⁰ is selected from the group consisting of hydrogen, —CH₂CH(OH)CH₂—R¹², and

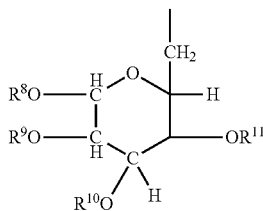

with the proviso that R⁵, R⁶, R⁷ R⁸, R⁹, R¹⁰ and R¹¹ are not all hydrogen,
R¹² is

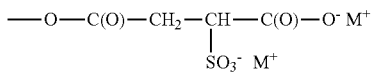

and M is a monovalent or divalent cation, and wherein the overall degree of polymerisation of the sulfosuccinate product is from 1 to 10.

3. The method of claim 2, wherein the sulfosuccinate is of formula (I) or (II) and wherein x, x' and x" are each independently from 1 to 20.

4. The method of claim 2, wherein the sulfosuccinate is of formula (I) or (II) and wherein Rᵃ is ethyl, isopropyl or ethoxyethane.

5. The method of claim 2, wherein the sulfosuccinate is made up of units of formula (III) and/or (IV) and the degree of polymerisation is from 1 to 5.

6. The method of claim 2 wherein the sulfosuccinate is of formula (I) or (II) and wherein the hydrocarbon group is an unbranched C10 to C22 alkyl or alkenyl group or a C8 to C22 terpene group, or wherein the sulfosuccinate is made up of units of formula (III) and/or (IV) and R is a C12 to C22 alkyl group.

7. The method of claim 2 wherein the cation M is selected from the group consisting of: alkali metal ions, ammonium ions, and alkanolammonium ions.

8. The method of claim 2 wherein the sulfosuccinate is of formula (I).

9. The method of claim 1 wherein the sulfosuccinate has a molecular weight of greater than 700 Da.

10. The method of claim 1 wherein the sulfosuccinate has a molecular weight of from 300 to 1600 Da.

11. The method of claim 1 wherein the sulfosuccinate has an HLB value of from 0 to 7.

12. The method of claim 1 wherein the metal component is in an industrial aqueous system and wherein the metal component contacts the aqueous fluid within the industrial aqueous system.

13. The method of claim 12 wherein the industrial aqueous system is selected from the group consisting of an aqueous system in a hydrocarbon plant; a chemical plant; a water plant; and a paper manufacturing plant.

14. The method of claim 13 wherein the industrial aqueous system is an oilfield system or a downstream oil-related system.

15. The method of claim 14 wherein the industrial aqueous system is an oilfield production system or an oilfield distribution system or an oil refining system.

16. The method of claim 1 wherein the aqueous fluid is acidic.

17. The method of claim 1 wherein the metal component comprises a material selected from the group consisting of: ferrous material, copper, aluminium, and combinations thereof.

18. The method of claim 17 wherein the metal component comprises steel.

19. The method of claim 1 wherein the sulfosuccinate is used together with one or more component selected from the group consisting of: corrosion inhibitors that are not sulfosuccinates; surfactants; solvents; antifoam agents; demulsifiers; scale inhibitors; dispersants and biocides.

20. The method of claim 1 wherein the amount of sulfosuccinate used is from 1 ppm to 1000 ppm.

21. A method of inhibiting corrosion of a metal component of an industrial aqueous system that is in contact with, or will be in contact with, an aqueous fluid, wherein the metal component contacts the aqueous fluid within the industrial aqueous system, the method comprises:
applying a sulfosuccinate to a metal component of an industrial aqueous system or adding the sulfosuccinate to an aqueous fluid that is in contact with, or will be in contact with, the metal component of the industrial aqueous system,
wherein the sulfosuccinate is a reaction product of maleic anhydride and a compound selected from the group consisting of: a fatty alkanolamide, a fatty alkoxylated alkanolamide, a fatty alcohol, a fatty alkoxylated alcohol, an alkoxylated terpene group, and an alkyl polyglucoside, followed by reaction with a bisulfite;
wherein the fatty group of the compound is a C8-30 unbranched alkyl or alkenyl group.

22. The method of claim 21 wherein the industrial aqueous system is selected from the group consisting of an aqueous system in a hydrocarbon plant; a chemical plant; a water plant; and a paper manufacturing plant.

23. The method of claim 22 wherein the industrial aqueous system is an oilfield system or a downstream oil-related system.

24. The method of claim 23 wherein the industrial aqueous system is an oilfield production system or an oilfield distribution system or an oil refining system.

* * * * *